United States Patent
Nakabayashi

(10) Patent No.: US 7,576,531 B2
(45) Date of Patent: Aug. 18, 2009

(54) SWITCHING REGULATOR AND ELECTRONIC DEVICE THEREWITH

(75) Inventor: Hirotaka Nakabayashi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 160 days.

(21) Appl. No.: 11/908,314

(22) PCT Filed: Mar. 14, 2006

(86) PCT No.: PCT/JP2006/304985

§ 371 (c)(1),
(2), (4) Date: Sep. 11, 2007

(87) PCT Pub. No.: WO2006/103912

PCT Pub. Date: Oct. 5, 2006

(65) Prior Publication Data

US 2009/0066304 A1 Mar. 12, 2009

(30) Foreign Application Priority Data

Mar. 28, 2005 (JP) .............................. 2005-090479

(51) Int. Cl.
G05F 1/573 (2006.01)
G05F 1/575 (2006.01)
(52) U.S. Cl. ....................... 323/285; 323/284
(58) Field of Classification Search ................. 323/265, 323/282, 284, 285, 299, 315, 351, 908; 361/87, 361/93.9; 363/50
See application file for complete search history.

(56) References Cited

U.S. PATENT DOCUMENTS

| | | | | |
|---|---|---|---|---|
| 3,597,655 A | * | 8/1971 | Forte | 361/56 |
| 4,929,882 A | * | 5/1990 | Szepesi | 323/222 |
| 5,675,240 A | * | 10/1997 | Fujisawa et al. | 323/282 |
| 6,166,530 A | * | 12/2000 | D'Angelo | 323/316 |
| 6,501,253 B2 | * | 12/2002 | Marty | 323/280 |
| 2004/0004469 A1 | * | 1/2004 | Pihet et al. | 323/282 |
| 2005/0275391 A1 | * | 12/2005 | Ito et al. | 323/282 |

FOREIGN PATENT DOCUMENTS

| JP | 10-214123 | 8/1998 |
|---|---|---|
| JP | 2002-300773 | 10/2002 |
| JP | 2003-078362 | 3/2003 |

* cited by examiner

Primary Examiner—Gary L Laxton
(74) Attorney, Agent, or Firm—Fish & Richardson P.C.

(57) ABSTRACT

A switching regulator according to the invention includes: an output switching element; an output feedback circuit generating an error voltage (Verr) according to an error between an output voltage (Vout) and a target voltage; a switching control circuit turning on and off the output switching element based on the error voltage (Verr); a short-circuit current protection circuit that includes a first comparator (CMP1) comparing a reference voltage (Vs) commensurate with an output current (iout) with a first threshold voltage (Vth1) and that instructs, based on this comparison result, whether to drive the switching control circuit; and a drive current generating circuit that includes a second comparator (CMP2) comparing the error voltage (Verr) with a second threshold voltage (Vth2) and that determines, based on this comparison result, whether to supply a drive current (i1) to the first comparator (CMP1). With this configuration, it is possible to reduce the waste of electric power without spoiling the reliability of short-circuit current protection.

4 Claims, 3 Drawing Sheets

SWITCHING REGULATOR AND ELECTRONIC DEVICE THEREWITH

TECHNICAL FIELD

The present invention relates to a switching regulator including a short-circuit current protection circuit and to an electronic device incorporating such a switching regulator, and, more particularly, relates to an electric power consumption reduction technology therefor.

BACKGROUND ART

Conventionally, as means for supplying stabilized electric power with low thermal loss and in addition with comparatively high efficiency in cases where input-output differences are large, there have been widely used switching regulators (chopper regulators) that generate a constant output voltage from an input voltage by the turning on and off of an output transistor (i.e., through control of the duty ratio thereof).

Such a switching regulator generally includes a short-circuit current protection circuit that limits its output current in the event of an overload or output short-circuit (for example, see patent document 1).

As another conventional technology related to the present invention, there has been disclosed and proposed a power semiconductor device including an overcurrent preventing circuit that detects whether an output transistor operates within a safe operation range to prevent the output transistor from falling outside the permissible loss range and being destroyed by heat (see patent document 2).

Patent document 1: JP-A-2002-300773
Patent document 2: JP-A-2003-078362

DISCLOSURE OF THE INVENTION

Problems to be Solved by the Invention

To be sure, with a conventional switching regulator including a short-circuit current protection circuit, it is possible to appropriately stop the operation of a regulator to limit its output current even in the event of an overload or output short-circuit. This helps prevent the breakdown of an output transistor or other damage.

Disadvantageously, however, in the conventional switching regulator, the short-circuit current protection circuit constantly monitors the output current to be ready for short-circuit current protection all the time, with the result that electric power is unnecessarily consumed at a light load or in a similar load condition.

In particular, in order for the short-circuit current protection circuit to detect an overcurrent (an output short-circuit), a comparator is needed that monitors variations in the output current, and is required to be quickly responsive to accurately monitor the output current, which varies rapidly as the output transistor is switched on and off. Thus, in the conventional short-circuit current protection circuit, as a drive current for the comparator, a high current equal to or greater than 100 μA needs to be supplied constantly. This results in significantly reduced power efficiency of the switching regulator. Moreover, when the comparator is used as means for converting the output of a battery, electric power stored in the battery is wasted. This disadvantageously reduces the period of use of an electronic device.

An object of the present invention is to provide a switching regulator with which it is possible to reduce the waste of electric power without spoiling the reliability of short-circuit current protection, and to provide an electronic device incorporating such a switching regulator.

Means for Solving the Problem

To achieve the above object, according to one aspect of the present invention, a switching regulator includes: an output switching element connected between an input terminal to which an input voltage is applied and an output terminal from which an output voltage is derived to be fed to a load; an output feedback circuit generating an error voltage varying according to an error between an actual value of and a target value of the output voltage; a switching control circuit turning on and off the output switching element based on the error voltage so that the error of the output voltage is reduced; a short-circuit current protection circuit including a first comparator comparing with a predetermined first threshold voltage an output current reference voltage varying according to an output current to the load, the short-circuit current protection circuit generating, based on a comparison output signal from the first comparator, a short-circuit current protection signal instructing whether to drive the switching control circuit; and a drive current generating circuit including a second comparator operating with a drive current lower than a drive current for the first comparator and comparing the error voltage with a predetermined second threshold voltage, the drive current generating circuit determining, based on a comparison output signal from the second comparator, whether to supply the drive current to the first comparator (a first configuration).

More specifically, in the switching regulator of the first configuration, the drive current generating circuit prohibits supply of the drive current to the first comparator until the output current reaches a second threshold current determined by the second threshold voltage, and the drive current generating circuit allows supply of the drive current to the first comparator when the output current reaches the second threshold current; the short-circuit current protection circuit allows driving of the switching control circuit after supply of the drive current to the short-circuit current protection circuit is allowed until the output current reaches a first threshold current that is determined by the first threshold voltage and that is higher than the second threshold current, and the short-circuit current protection circuit prohibits driving of the switching control circuit when the output current reaches the first threshold current (a second configuration).

With this configuration, when the output current is normal at a light load or in a similar load condition, the supply of the driving current to the first comparator is stopped so that waste of electric power consumption by the short-circuit current protection circuit is reduced; when there is a sign of an imminent abnormal rise in the output current, the supply of the drive current to the first comparator is allowed. Hence, it is possible to remain ready for high-speed short-circuit current protection all the time. This helps reduce the waste of electric power without spoiling the reliability of short-circuit current protection.

In the switching regulator of either of the first and second configurations, the drive current generating circuit includes: a constant current source generating a constant current lower than the drive current for the first comparator; a mirror amplifier circuit mirror-amplifying the constant current to generate the drive current for the first comparator; and a switching element connected between an output terminal of the constant current source and ground and turned on and off based on the comparison output signal from the second comparator such that the switching element remains on until the output current reaches the second threshold current and the switching element is turned off when the output current reaches the second threshold current (a third configuration). With this configuration, it is possible to reduce the power consumption of the drive current generating circuit to a minimum.

According to another aspect of the invention, an electronic device includes: a battery serving as a power source for the electronic device; and means for converting the output of the battery. Here, the electronic device includes, as means for converting the output, any one of the switching regulators of the first to third configurations (a fourth configuration). With this configuration, due to reduced waste of electric power stored in a battery in the short-circuit current protection circuit, it is possible to extend the period of use of the electronic device.

Advantages of the Invention

As described above, with a switching regulator according to the invention or an electronic device incorporating such a switching regulator, it is possible to reduce the waste of electric power without spoiling the reliability of short-circuit current protection.

LIST OF REFERENCE SYMBOLS

10 Battery
20 DC-to-DC converter (switching regulator)
30 TFT liquid crystal panel
1 Output switching element (output transistor)
2 Smoothing circuit
3 Output feedback circuit
4 Switching control circuit
5 Short-circuit current protection circuit (SCP circuit)
6 Drive current generating circuit
T1 Input terminal
T2 Output terminal
AMP1 Error amplifier
E1 Direct-current voltage source
R1 to R3 Resistor
C1 Capacitor
Rs Sense resistor
AMP2 Differential amplifier
CMP1 First comparator (high-speed)
E2 Direct-current voltage source
LTC1 Latch circuit
N1 to N5 N-channel field effect transistor
P1 and P2 P-channel field effect transistor
I1 and I2 Constant current source
E3 Direct-current voltage source
CMP2 Second comparator (low-speed)

BEST MODE FOR CARRYING OUT THE INVENTION

Hereinafter, a description will be given of an example where the present invention is applied to a DC-to-DC converter that is incorporated in a mobile telephone to convert the output voltage of a battery to generate drive voltages for different portions (such as a TFT (thin film transistor) liquid crystal panel) of the mobile telephone.

Figure 1:
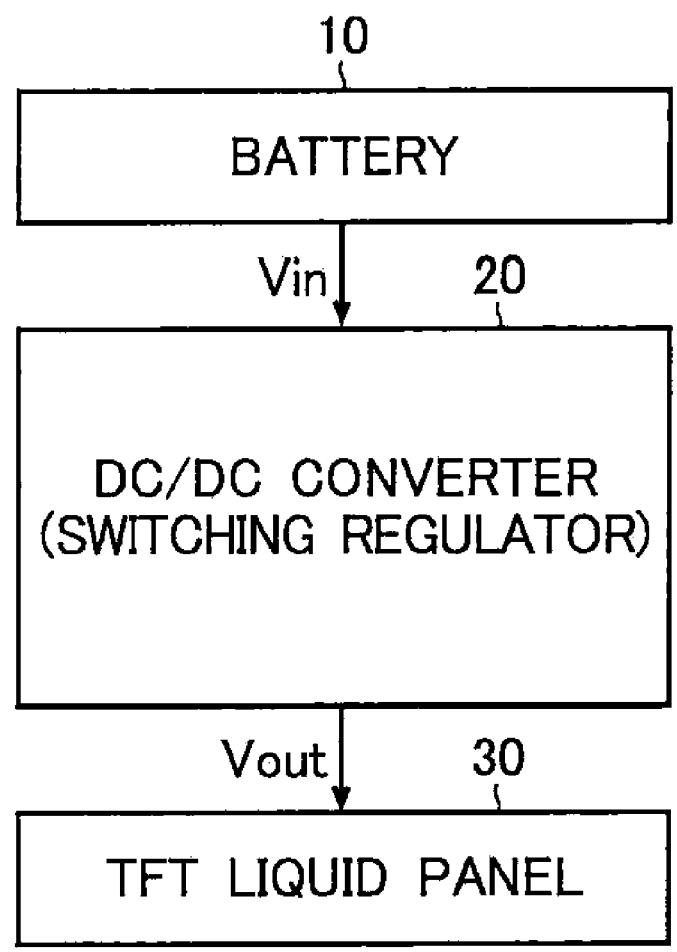
FIG. 1 A block diagram showing a mobile telephone as an embodiment of the present invention.

FIG. 1 is a block diagram showing a mobile telephone (in particular, its power supply system for the TFT liquid crystal panel) as an embodiment of the invention. As shown in FIG. 1, the mobile telephone of this embodiment includes: a battery 10 serving as the power source for the mobile telephone; a DC-to-DC converter 20 serving as means for converting the output of the battery 10; and the TFT liquid crystal panel 30 serving as means for display on the mobile telephone. The mobile telephone of this embodiment naturally includes, as means for achieving its essential capabilities (such as communication capabilities), a transmitter/receiver circuit, a speaker, a microphone, a display, an operation section and a memory, although unillustrated in FIG. 1.

The DC-to-DC converter 20 generates a constant output voltage Vout from an input voltage Vin applied from the battery 10, and supplies the output voltage Vout to the TFT liquid crystal panel 30.

Figure 2:
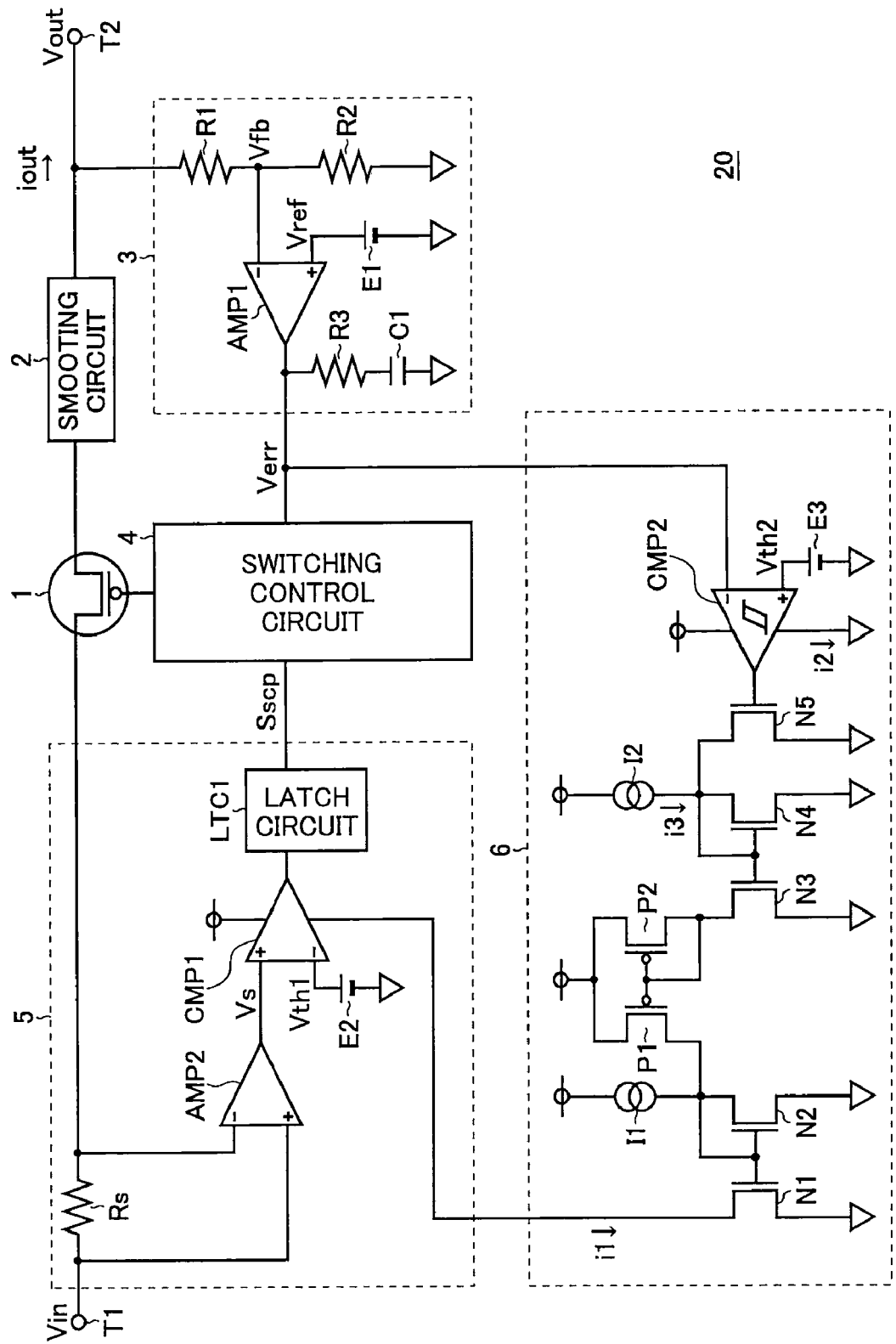
FIG. 2 A circuit diagram showing an example of the configuration of a DC-to-DC converter 20.

FIG. 2 is a circuit diagram (partly a block diagram) showing an example of the configuration of the DC-to-DC converter 20. As shown in FIG. 2, the DC-to-DC converter 20 of this embodiment is a switching regulator (chopper regulator) composed of: an output switching element 1; a smoothing circuit 2; an output feedback circuit 3; a switching control circuit 4; a short-circuit current protection circuit 5 (hereinafter called "SCP (short current protection) circuit 5"); and a drive current generating circuit 6.

In the DC-to-DC converter 20, in addition to these circuit components, any other protection circuit (such as a low input erroneous operation preventing circuit or a thermal protection circuit) may be incorporated as required.

The output switching element 1 is connected between an input terminal T1 to which the input voltage Vin is applied and an output terminal T2 from which the output voltage Vout is derived to be fed to a load (unillustrated). Although the following description discusses an example where a P-channel field effect transistor is used as the output switching element 1, this is not meant to limit the configuration of the invention; any other switching element such as an N-channel field effect transistor or a bipolar transistor may be used instead.

The smoothing circuit 2 serves as means that smoothes a pulse voltage obtained by the turning on and off of the switching element 1 to generate the output voltage Vout. As the configuration of the smoothing circuit 2, a commonly known configuration may be adopted in which an inductor, a capacitor, a resistor, a diode and the like are included as required.

The output feedback circuit 3 is composed of an error amplifier AMP1, a direct-current voltage source E1, resistors R1 to R3 and a capacitor C1.

One end of the resistor R1 is connected to the output terminal T2 (or the output terminal of the output switching element 1), The other end of the resistor R1 is grounded via the resistor R2, and is also connected to the inverting input terminal (−) of the error amplifier AMP1. The non-inverting input terminal (+) of the error amplifier AMP1 is connected to the positive terminal of the direct-current voltage source E1. The negative terminal of the direct-current voltage source E1 is grounded. The output terminal of the error amplifier AMP1 is connected to the error voltage input terminal of the switching control circuit 4, and is also grounded via the resistor R3 and the capacitor C1.

Thus, the output feedback circuit 3 serves as means for generating, with the error amplifier AMP1, an error voltage Verr varying according to the error between an output feedback voltage Vfb (corresponding to the actual value of the output voltage Vout) derived from the node between the resistors R1 and R2 and a reference voltage Vref (corresponding to the target value of the output voltage Vout) generated by the direct-current voltage source E1.

The resistor R3 and the capacitor C1 serve as means for phase compensation to maintain an appropriate gain-frequency characteristic of the output feedback circuit 3 and to prevent oscillation thereof.

The switching control circuit 4 serves as means for turning on and off the output switching element 1 based on the error voltage Verr (i.e., through control of the duty ratio thereof) so as to reduce the error of the output voltage Vout. More specifically, the switching control circuit 4 turns on and off the output switching element 1 in such a manner as to decrease the duty ratio as the error voltage Verr increases and increase the duty ratio as the error voltage Verr decreases. Whether to drive the switching control circuit 4 is controlled based on a short-circuit current protection signal Sscp, which will be described later.

The SCP circuit 5 is composed of a sense resistor Rs, a differential amplifier AMP2, a first comparator CMP1, a direct-current voltage source E2 and a latch circuit LTC1.

One end of the sense resistor Rs is connected to the input terminal T1, and the other end thereof is connected to the input terminal of the output switching element 1. The non-inverting input terminal (+) of the differential amplifier AMP2 is connected to the one end of the sense resistor Rs, and the inverting input terminal (−) thereof is connected to the other end of the sense resistor Rs. The output terminal of the differential amplifier AMP2 is connected to the non-inverting input terminal (+) of the first comparator CMP1. The inverting input terminal (−) of the first comparator CMP1 is connected to the positive terminal of the direct-current voltage source E2. The negative terminal of the direct-current voltage source E2 is grounded. The output terminal of the first comparator CMP1 is connected via the latch circuit LTC1 to the short-circuit current protection signal input terminal of the switching control circuit 4.

The sense resistor Rs serves as means for converting the output current iout to the load into a voltage. The differential amplifier AMP2 amplifies the voltage across the sense resistor Rs to generate an output-current reference voltage Vs varying according to the output current iout.

Figure 3:
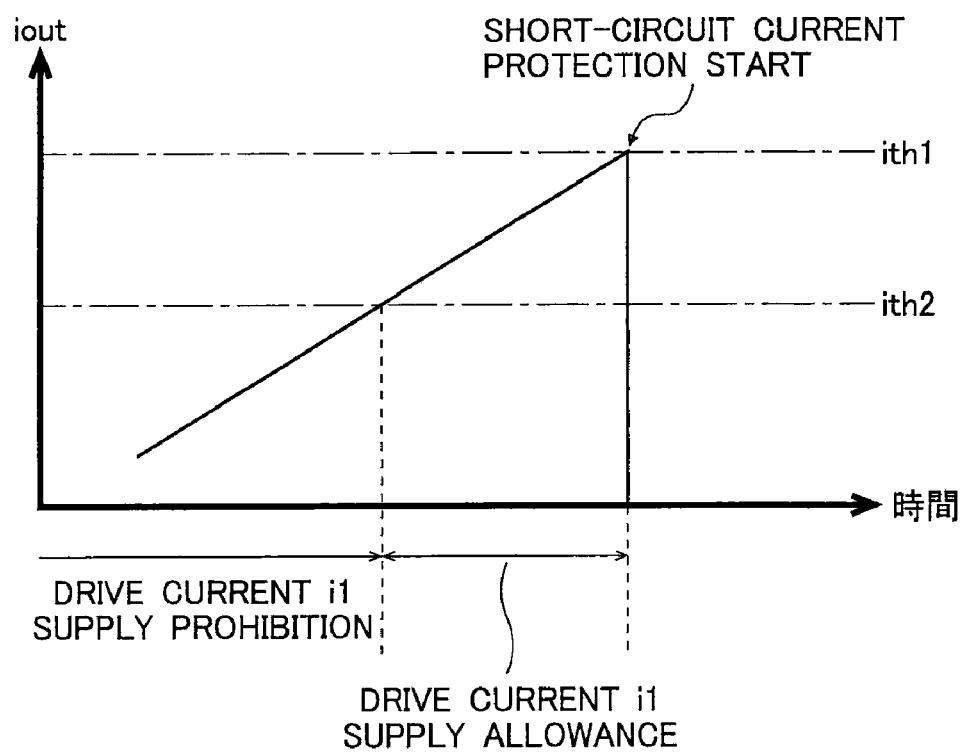
FIG. 3 A diagram illustrating how an SCP circuit 5 and a drive current generating circuit 6 operate.

The first comparator CMP1 compares the output-current reference voltage Vs with a predetermined first threshold voltage Vth1 (corresponding to, in terms of the output current iout, a first threshold current ith1 serving as a threshold level for starting the short-circuit current protection, see FIG. 3) generated by the direct-current voltage source E2, and thereby generates a comparison output signal. More specifically, the first comparator CMP1 generates a high-level comparison output signal when the output-current reference voltage Vs is higher than the first threshold voltage Vth1; on the other hand, the first comparator CMP1 generates a low-level comparison output signal when the output-current reference voltage Vs is lower than the first threshold voltage Vth1. The first comparator CMP1, which directly monitors variations in the output current iout, is required to be quickly responsive to accurately monitor the output current iout, which varies rapidly as the output transistor is switched on and off. To achieve that, as the drive current i1 for the first comparator CMP1, a high current equal to or greater than 100 μA is prepared.

The latch circuit LTC1 latches, once the comparison output signal from the first comparator CMP1 turns high, the logic state thereof, and feeds the latched output as the short-circuit current protection signal Sscp to the switching control circuit 4. As the latch circuit LTC1, an Rs flip-flop or the like may be used.

As will be understood from the above description, the SCP circuit 5 includes the first comparator CMP1 comparing the output-current reference voltage Vs with the first threshold voltage Vth1, and serves as means for generating, based on the comparison output signal, the short-circuit current protection signal Sscp instructing whether to drive the switching control circuit 4.

Specifically, the SCP circuit 5 feeds out a low-level short-circuit current protection signal Sscp to notify that the output current iout is normal; on the other hand, it feeds out a high-level short-circuit current protection signal Sscp to notify that the output current iout is abnormal. Receiving the short-circuit current protection signal Sscp, the switching control circuit 4, when the logic level of that signal is low, recognizes that no output short-circuit is occurring and thus operates normally and, when the logic level of that signal is high, recognizes that an output short-circuit is occurring and thus stops operating.

The drive current generating circuit 6 is composed of a second comparator CMP2, a direct-current voltage source E3, N-channel field effect transistors N1 to N5, P-channel field effect transistors P1 and P2 and constant current sources I1 and I2.

The inverting input terminal (−) of the second comparator CMP2 is connected to the output terminal of the error comparator AMP1. The non-inverting input terminal (+) of the second comparator CMP2 is connected to the positive terminal of the direct-current voltage source E3. The negative terminal of the direct-current voltage source E3 is grounded. The output terminal of the second comparator CMP2 is connected to the gate of the transistor N5. The drain of the transistor N5 is connected via the constant current source I2 to a terminal to which the supplied voltage is applied, and is also connected to the drain of the transistor N4. The source of the transistor N5 is grounded. The gates of the transistors N3 and N4 are connected to each other, and the node therebetween is connected to the drain of the transistor N4. The sources of the transistors N3 and N4 are both grounded. The drain of the transistor N3 is connected to that of the transistor P2. The gates of the transistors P1 and P2 are connected to each other, and the node therebetween is connected to the drain of the transistor P2. The sources of the transistors P1 and P2 are both connected to the terminal to which the supplied voltage is applied. The drain of the transistor P1 is connected via the constant current source I1 to the terminal to which the supplied voltage is applied, and is also connected to the drain of the transistor N2. The gates of the transistors N1 and N2 are connected to each other, and the node therebetween is connected to the drain of the transistor N2. The sources of the transistors N1 and N2 are both grounded. The drain of the transistor N1 serves as a terminal from which a drive current is supplied to the first comparator CMP1.

The second comparator CMP2 compares the error voltage Verr with a predetermined second threshold voltage Vth2 (corresponding to, in terms of the output current iout, a second threshold current ith2 serving as a threshold level for starting the supply of the drive current i1, see FIG. 3) generated by the direct-current voltage source E3, and thereby generates a comparison output signal. More specifically, the second comparator CMP2 generates a low-level comparison output signal when the error voltage Verr is higher than the second threshold voltage Vth2; on the other hand, the second comparator CMP2 generates a high-level comparison output signal when the error voltage Verr is lower than the second threshold voltage Vth2. The second comparator CMP2, which monitors the error voltage Verr, is not required to respond as quickly as the first comparator CMP1, which directly monitors variations in the output current iout. Thus, as a drive current i2 for the second comparator CMP2, a current lower than the drive current i1 for the first comparator CMP1 is prepared.

In the stage succeeding the second comparator CMP2, the drive current generating circuit 6 includes: the constant current source I2 generating a constant current i3 lower than the drive current i1 for the first comparator CMP1; a mirror amplifier circuit (composed of the transistors N1 to N4 and the transistors P1 and P2) mirror-amplifying the constant current i3 to generate the drive current i1 for the first comparator CMP1; and the transistor N5 connected between the output terminal of the constant current source I2 and the ground, the transistor N5 being turned on and off based on the comparison output signal from the second comparator CMP2.

The transistor N5 remains on until the error voltage Verr reaches the second threshold voltage Vth2, that is, until the output current iout reaches the second threshold current ith2. In the meantime, the constant current i3 is diverted to the ground so that the mirror amplifier circuit is prevented from generating the drive current i1 for the first comparator CMP1.

On the other hand, when the error voltage Verr reaches the second threshold voltage Vth2, that is, when the output current iout reaches the second threshold current ith2, the transistor N5 is turned off. Thus, the constant current i3 is fed to the mirror amplifier circuit, which thus generates the drive current i1 for the first comparator CMP1.

The drive current i2 for the second comparator CMP2 and the constant current i3 generated by the constant current source I2 are set so that their sum is sufficiently lower than the drive current i1 for the first comparator CMP1. It is thus thought that the efficiency of light load operation is little affected by the power consumption of the drive current generating circuit 6.

As will be understood from the above description, the drive current generating circuit 6 is designed with attention focused on the fact that monitoring the error voltage Verr permits the output current iout to be monitored indirectly; accordingly the drive current generating circuit 6 is provided with the second comparator CMP2, which operates with the drive current i2 lower than that for the first comparator CMP1 and compares the error voltage Verr with the second threshold voltage Vth2, to serve as means for determining, based on the comparison output signal from the second comparator CMP2, whether to supply the drive current i1 to the first comparator CMP1.

In the DC-to-DC converter 20 of this embodiment, as shown in FIG. 3, the drive current generating circuit 6 prohibits the supply of the drive current i1 to the first comparator CMP1 until the output current iout reaches the second threshold current ith2 (e.g., two amperes), and the drive current generating circuit 6 allows the supply of the drive current i1 to the first comparator CMP1 when the output current it reaches the second thresholds current ith2; on the other hand, the SCP circuit 5 allows the driving of the switching control circuit 4 after the supply of the drive current i1 is allowed until the output current iout reaches the first threshold current ith1 (e.g., three amperes) higher than the second threshold current ith2, and the SCP circuit 5 prohibits the driving of the switching control circuit 4 when the output current iout reaches the first threshold current ith1.

In this way, when the output current iout is normal at a light load or in a similar load condition, the supply of the driving current i1 to the first comparator CMP1 is stopped so that waste of electric power consumption by the SCP circuit 5 is reduced; when there is a sign of an imminent abnormal rise in the output current iout (that is, when a current flows that is not high enough to affect efficiency), the supply of the drive current i1 to the first comparator CMP1 is allowed. Hence, it is possible to remain ready for high-speed short-circuit current protection all the time. This helps reduce the waste of electric power (i.e., the waste of electric power stored in the battery 10) without spoiling the reliability of short-circuit current protection. It is thus possible to extend the period of use of the mobile telephone.

Although the embodiment described above discusses an example where the present invention is applied to a DC-to-DC converter 20 incorporated in a mobile telephone and used as means for converting the output of a battery 10, this is not meant to limit the application of the invention; the invention finds wide application generally in switching regulators that include a short-circuit current protection circuit.

Otherwise than specifically described by way of an embodiment above, many modifications and variations are possible without departing from the spirit of the invention.

INDUSTRIAL APPLICABILITY

The present invention offers a technology useful in reducing the power consumption of a switching regulator incorporating a short-circuit current protection circuit. In particular, the technology is suitable in battery-operated electronic devices.

What is claimed is:

1. A switching regulator comprising:
an output switching element connected between an input terminal to which an input voltage is applied and an output terminal from which an output voltage is derived to be fed to a load;
an output feedback circuit generating an error voltage varying according to an error between an actual value of and a target value of the output voltage;
a switching control circuit turning on and off the output switching element based on the error voltage so that the error of the output voltage is reduced;
a short-circuit current protection circuit including:
a first comparator comparing with a predetermined first threshold voltage an output current reference voltage varying according to an output current to the load,
the short-circuit current protection circuit generating, based on a comparison output signal from the first comparator, a short-circuit current protection signal instructing whether to drive the switching control circuit; and
a drive current generating circuit including:
a second comparator operating with a drive current lower than a drive current for the first comparator and comparing the error voltage with a predetermined second threshold voltage,
the drive current generating circuit determining, based on a comparison output signal from the second comparator, whether to supply the drive current to the first comparator.

2. The switching regulator of claim 1,
wherein the drive current generating circuit prohibits supply of the drive current to the first comparator until the output current reaches a second threshold current determined by the second threshold voltage, and the drive current generating circuit allows supply of the drive current to the first comparator when the output current reaches the second threshold current, and,
the short-circuit current protection circuit allows driving of the switching control circuit after supply of the drive current to the short-circuit current protection circuit is allowed until the output current reaches a first threshold current that is determined by the first threshold voltage and that is higher than the second threshold current, and the short-circuit current protection circuit prohibits driving of the switching control circuit when the output current reaches the first threshold current.

3. The switching regulator of claim 2,
wherein the drive current generating circuit comprises:
   a constant current source generating a constant current lower than the drive current for the first comparator;
   a mirror amplifier circuit mirror-amplifying the constant current to generate the drive current for the first comparator; and
   a switching element connected between an output terminal of the constant current source and ground and turned on and off based on the comparison output signal from the second comparator such that,
   the switching element remains on until the output current reaches the second threshold current, and
   the switching element is turned off when the output current reaches the second threshold current.

4. An electronic device comprising:
a battery serving as a power source for the electronic device; and
means for converting an output of the battery,
wherein used as the means is the switching regulator of any one of claims 1 to 3.

* * * * *